United States Patent [19]

Seelenbinder

[11] 4,201,466

[45] May 6, 1980

[54] PHOTOPRINTER WITH SELF-LOCATING ROLL SPREADER

[75] Inventor: Terry G. Seelenbinder, Elk Grove Village, Ill.

[73] Assignee: AM International, Inc., Los Angeles, Calif.

[21] Appl. No.: 9,417

[22] Filed: Feb. 5, 1979

[51] Int. Cl.² ............................................... G03B 27/22
[52] U.S. Cl. ..................................... 355/104; 355/110
[58] Field of Search .......................... 355/85, 104–111, 355/117; 226/194; 271/7, 264

[56] References Cited

U.S. PATENT DOCUMENTS

| | | | |
|---|---|---|---|
| 2,900,889 | 8/1959 | Jaffe et al. | 355/110 |
| 3,215,055 | 11/1965 | Campbell et al. | 355/106 |
| 3,361,047 | 1/1968 | Breuers | 355/110 |
| 3,728,024 | 4/1973 | Nagai | 355/104 X |

Primary Examiner—Richard A. Wintercorn
Attorney, Agent, or Firm—Anthony W. Karambelas; Michael A. Kondzella

[57] ABSTRACT

In an elongate exposure assembly in a copying machine, an illumination cylinder is nested in an array of elongate rolls which cooperate with endless elastic belts to drive the cylinder and feed the originals and copy sheets around the same. The rolls are of minimum stiffness, but are nevertheless capable of acting to feed the sheets correctly by reason of one or more self-locating spreader plates arranged at appropriate positions along their lengths to hold the rolls locally in the proper relationship to each other. Each such plate is provided with a throat opening into the cylinder receiving opening to provide access for the sheets to be exposed.

7 Claims, 6 Drawing Figures

PHOTOPRINTER WITH SELF-LOCATING ROLL SPREADER

BACKGROUND OF THE INVENTION

Photoprinters or copiers, particularly of the diazo or white print variety, used for making copies of engineering drawings, are frequently rather wide in order to handle drawings of all sizes. Machines capable of handling drawings whose width is 36 inches or more are in common use. The exposure portion of such a machine frequently comprises a horizontal rotating illumination cylinder (which in some cases is itself a fluorescent lamp bulb) together with belt and roll means for guiding the sheets around the illumination cylinder in close contact therewith.

Because the machines are so wide, the roll means must be correspondingly long, and since the rolls are transversely loaded by the resilient belts which they drive, there is a very significant tendency for the rolls to bend or bow in response to such belt tension, which, if allowed to occur, would result in many problems. In particular the bowing of the rolls would impair the paper feeding properties such that the paper is not fed flat and becomes crinkled in the process. Belt tracking difficulties can also occur. In order to minimize such problems, it is customary to construct these rolls on a comparatively massive scale with materials, diameters and wall thicknesses sufficient to prevent any significant deflection. This type of construction accounts for a very significant portion of the weight and cost of the machine, and a significant improvement would be enjoyed if some way could be found to materially reduce the stiffness requirements and thus the weight and cost of these rolls.

SUMMARY OF THE INVENTION

According to the discovery which constitutes the present invention, the rolls do not need to be rigid in themselves for the full width of the machine, and a degree of rigidity only sufficient to withstand the transverse pull of the belts over spans equal to short segments of the length of the illumination cylinder is all that is required. This result is achieved by merely placing one or more spreader plates at points along the roll lengths which thus shortens the loaded span to one-half, one-third, etc. of the full length of the rolls.

What is particularly significant is that the spreader plate is not required to be rigidly mounted on a frame which includes the end supports with precise alignment of its bearing points with those which support the roll ends. It has been discovered that the only requirement is that the spreader plate be so constructed as to position the roll bearing locations, which it defines, in a pattern of positions so related to each other that it is a close duplicate of the pattern of the bearing points in the fixed supports at the roll ends. The secondary support need only be prevented from excessively rotating in its plane and be suitably stopped against excessive vertical movement and horizontal movement in its plane to avoid excessive deflections due to gravity in one direction and excessive belt tension in another. Such stopping means will also prevent the possibility of damaging deflections of the rolls due to inertial excursions during shipping.

If it were desired to mount the spreader plate rigidly on a foundation element so as to act as a central roll support, this would normally be an impractical approach since the total width of the machine in the area below the exposure section is largely preempted by the wide sheets which must also pass through the development apparatus located at this position. Accordingly, access to a supporting member for a central portion of the exposure section could be difficult to arrange.

It is thus apparent that first recognition that a firm central support was not essential to operation with low stiffness rolls was an important aspect of this invention. When the assembly is complete, the illumination cylinder itself, which inherently exhibits a substantial degree of rigidity, becomes an appreciable portion of the aligning capability of the assembly, and the resilient belts are found to comform the location of the spreader plate sufficiently close to the optimum situation for effective cooperation between the rolls, the belts and the cylinder. The spreader plate may therefore be aptly described as substantially self-locating since it is not rigidly fastened to a main frame by bolts or the like.

It has further been discovered that the long rolls need not, in fact, be integral, and preferably each roll is made in short lengths, keyed together for unitary rotation so as to reduce the cost of roll construction and, at the same time expedite the process of assembly of the cylinder, rolls and belts into an operating unit, with the keyed connection being supported at the spreader plate.

DESCRIPTION OF THE PREFERRED EMBODIMENT

Figure 1:
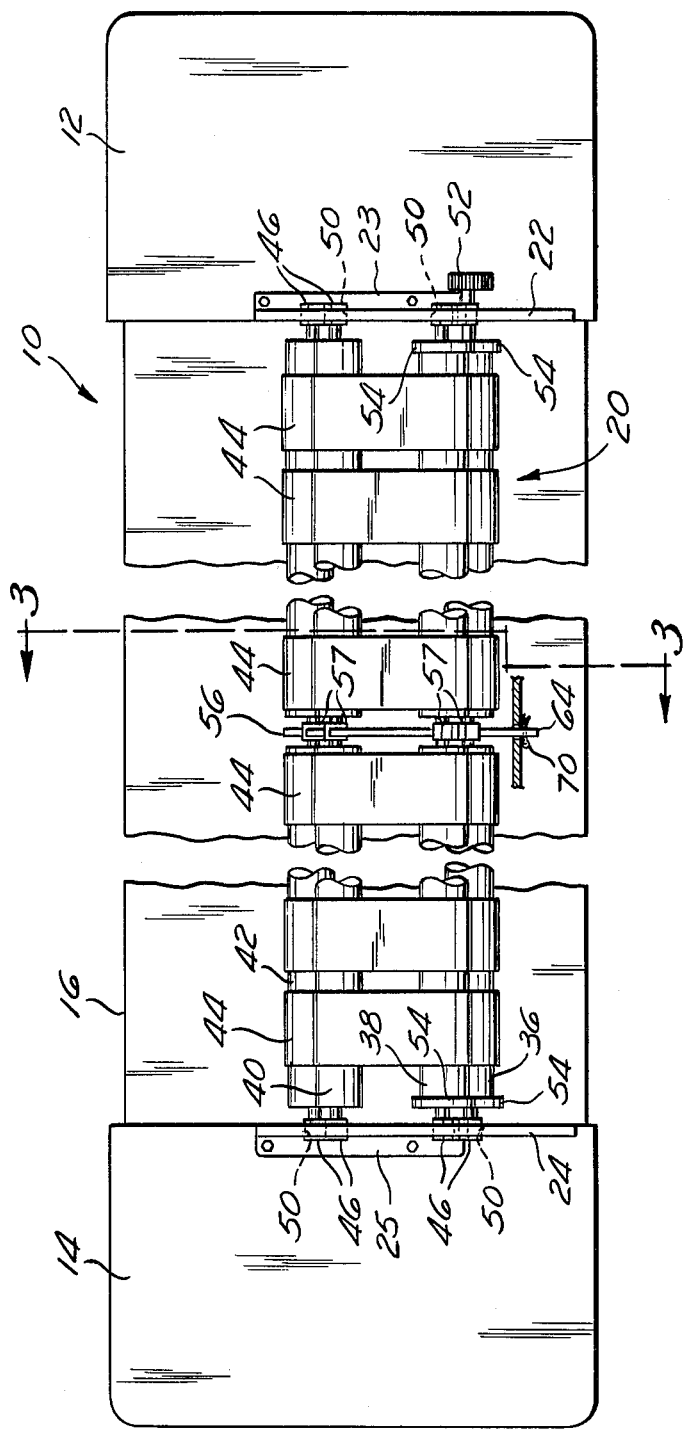
FIG. 1 is a condensed top plan of a machine according to the invention with the illumination cylinder and its mounting omitted for purposes of clarity.

Referring to FIG. 1, a machine embodying the present invention is indicated at 10 and includes two end assemblies 12 and 14 which are each of relatively rigid construction and house the various drive systems, pumps, motors, etc. responsible for machine operation.

These two end assemblies are connected by two spacing girders (not shown) and carry between them a central section 16 wich is made up largely of sheet metal covers housing the development section of the machine. The entire machine is supported by a suitable frame 18 (FIGS. 3 and 4) which is essentially connected with the end assemblies 12 and 14.

Figure 2:
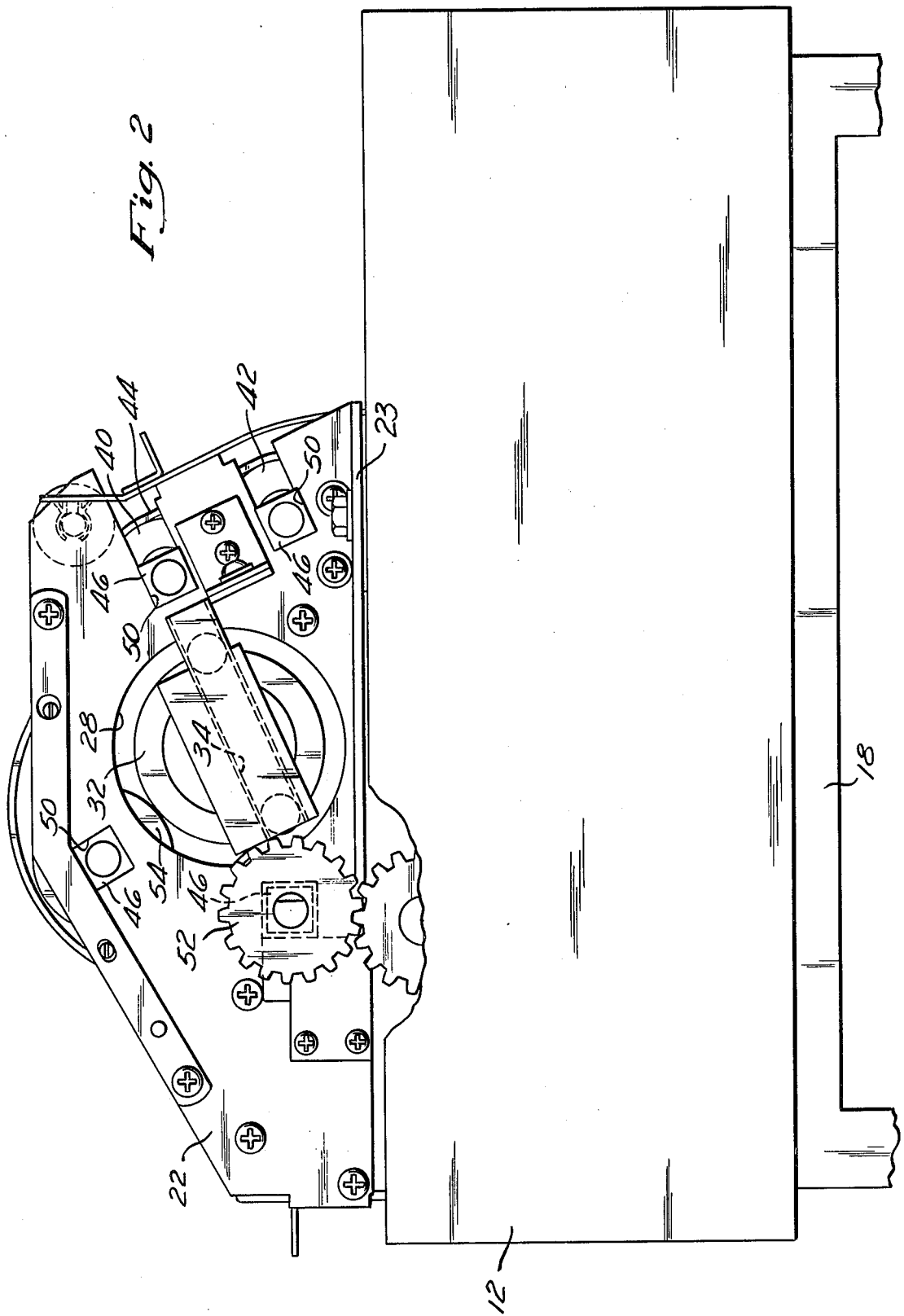
FIG. 2 is an end elevation of the machine according to the invention, looking from the right as seen in FIG. 1.

Arranged mainly above the central section 16 of the machine is an exposure device 20 which exhibits the principles of the present invention. To begin with, on the end assemblies 12, 14 are rigidly mounted end support plates 22 and 24 respectively which have lower flanges, 23 and 25 respectively, firmly fastened to the respective end assemblies, and which are connected by tie bars such as tie bar 26 seen in FIG. 3. Each of the end plates has a large central opening 28 which will freely receive the end of a rotary illumination cylinder 30 which in the present instance consists of a fluorescent lamp. The lamp is engaged at both ends by special electrical receptacles, one of which is shown at 32 in FIG. 2, which permit its rotation and which are arranged to have slight rectiliner motion transversely of the cylinder axis in tracks such as track 34, FIG. 2, mounted on the end plates. In FIG. 2 the lamp cannot be seen since it lies directly behind the receptacle 32 and is the same diameter.

The mechanism for rotating the cylinder 30 and for feeding originals and copy paper into contact with its surface for exposure comprises four rolls 36, 38, 40 and 42 together with a plurality of endless elastic belts 44 spaced along the lengths of the rolls. Each of the rolls is supported at its ends in bearings 46 which are slotted to mate with the margins of a suitable slot 50 of which there are four around the periphery of each of end support plates 22, 24.

Figure 3:
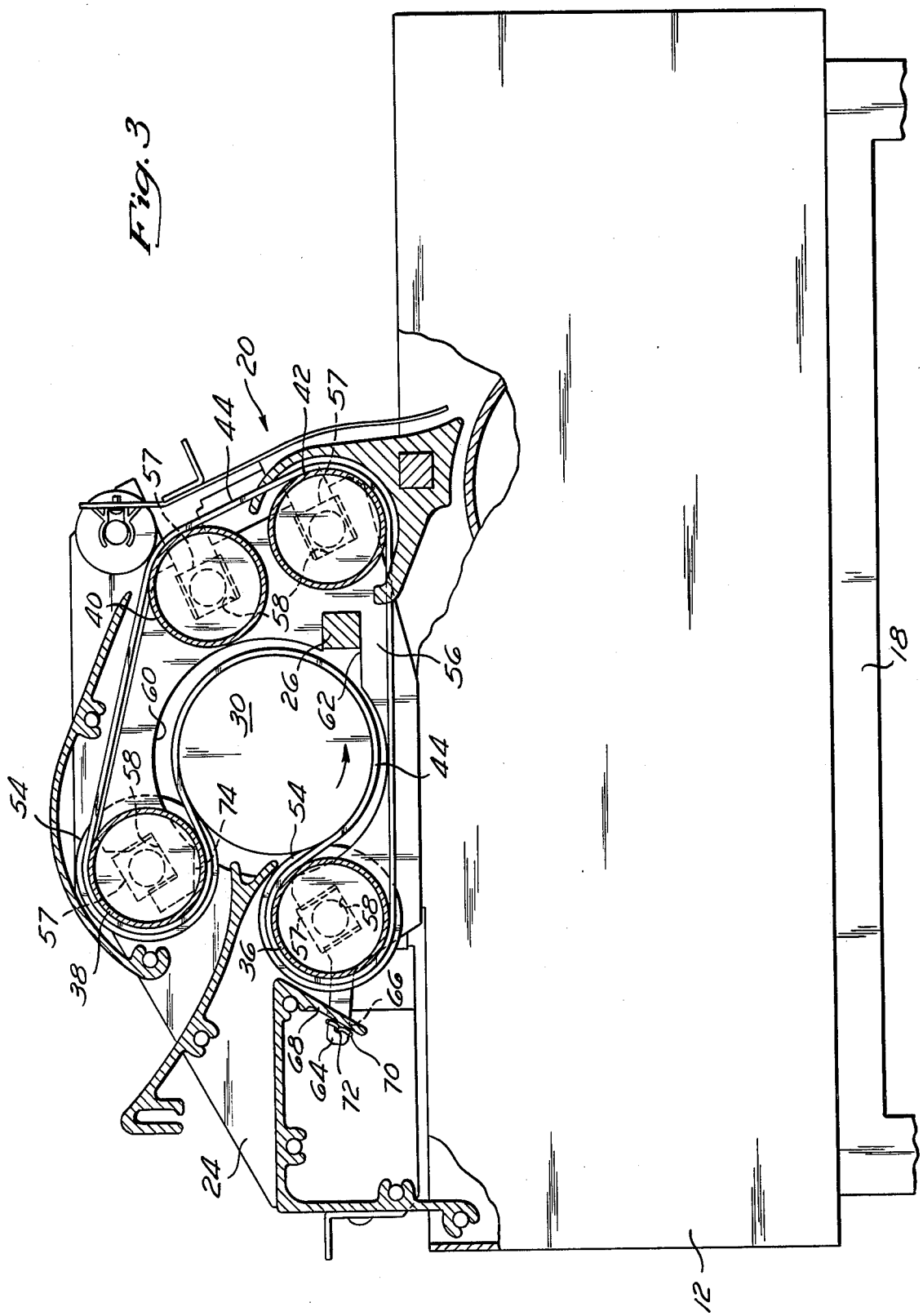
FIG. 3 is a central vertical section through the exposure portion of the machine constructed according to the invention and taken substantially on line 3—3 of FIG. 1, the lower portion of the machine being shown essentially in end elevation.

When the cylinder 30, rolls 36 to 42 and belts 44 are assembled in proper relationship as seen in FIGS. 1 and 3, the rolls will all be generally parallel to the axis of the cylinder 30 and each belt will be disposed about the exterior surfaces of the rolls, drawn between rolls 36 and 38, and wrapped around the cylinder 30 which is nested in the center of the rolls. As can be seen in FIG. 3, in use the transluscent original document and the light sensitive sheet are fed over the top of roll 36, between the belt and the cylinder, and travel anticlockwise around the cylinder to issue beneath the roll 38.

The roll 36 is the one which drives the system and has at one end a drive element such as gear 52, meshing with any conventional driving mechanism (not shown).

Rolls 36 and 38 each have at each end thereof a spacer or guide ring 54 which is of such diameter that the cylinder 30 is caused to stand off slightly from the rolls 36 and 38. That is to say, since the cylinder ends are floating by virtue of the tracks 34, the elasticity of the belts draws the cylinder leftward in FIG. 3 until it is in contact with the four rings 54, one on each end of rolls 36 and 38, and thereby defines its operating location.

The rolls 36 to 42, because they are permitted by the principles of the present invention to be made of less rigid material, of smaller diameter and/or having thinner walls, are relatively quite flexible. Over the wide span of the machine, therefore, they can easily be deflected inwardly towards the cylinder 30 near the middle of its length by the tension of the centrally disposed belts. Absent any further accomodation, this result would prevent effective operation of the machine because the original and copy sheets would not be fed flat, but rather would curve, crinkle, and be damaged by any attempt to feed them. Due to the slightly bowed rolls, the belts also might not track properly and would tend to bunch up instead of remaining each in its assigned plane.

It was discovered, however, that the difficulties inherent in this situation could be readily nullified in a very simple fashion. The main element in the solution is the provision of a spreader plate 56 which is mounted in a manner which may be described as self-locating.

Figure 4:
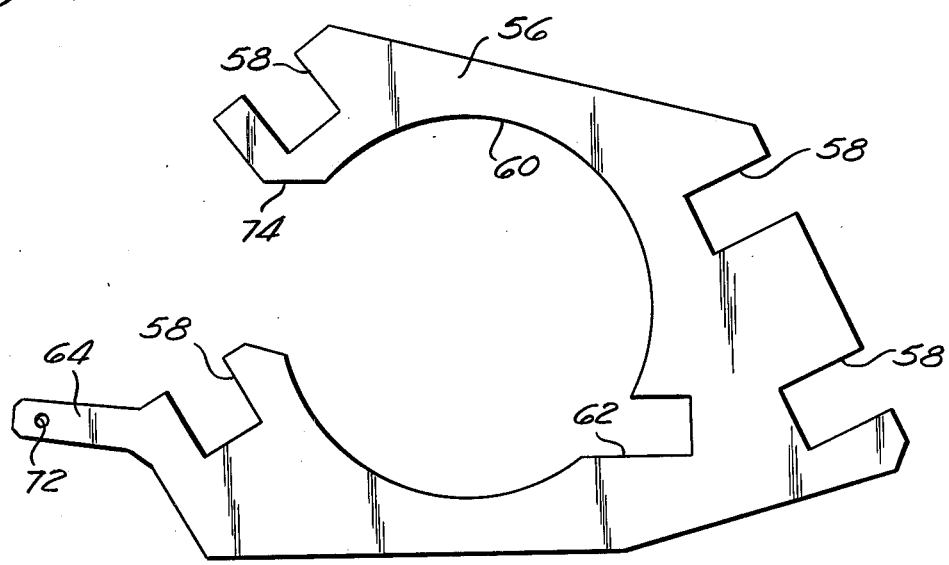
FIG. 4 is a detail face view of a self-locating spreader employed in carrying out the invention.

The plate 56 is illustrated by itself in FIG. 4, wherein it can be seen that the outline is rather different from that of the end support plates 22 and 24. However, it is so arranged that when bearings 57 midway of the lengths of the rolls are mated with the four slots 58 in the plate periphery, they will bear the same spacial relationships to each other as exist between the roll bearings at either end plate. In addition the central opening 60 which receives the cylinder 30 is not altogether enclosed by the plate, but communicates with the exterior at one point by a throat 74 to permit access of the original and copy sheets to the surace of the cylinder. A slot 62, which communicates with the central opening 60, is provided to accomodate the tie bar 26 which connects the two end support plates. There is also provided a tongue 64 projecting from one end of the spreader plate 56, namely that side which coooperates with the rolls 36 and 38. As seen in FIG. 3, this tongue projects loosely through an opening 66 in an elongate extruded member 68 which extends between the end plates 22 and 24 and serves as the feed table for guiding sheets into the exposure device 20. A retaining member, for example the cotter key 70, extends through an opening 72 in the tongue 64 and serves to retain the spreader plate in proper position with respect to one axis of orientation as will presently appear.

To summarize, the spreader plate is situated in the overall assembly at a location which provides no rigid frame-associated datum surface to which it can be handily attached. Its primary function is to keep the central portions of the rollers spread into an array having the proper spacial relationship about the cylinder 30 and to prevent their bowing so as to converge upon the cylinder.

By referring to FIG. 3 it can be seen that the spreader plate 56 is in effect self-locating. Its position derives from the influence upon it of the cylinder 30, the rolls 36 to 42 and the belts 44, plus the effect of certain guiding and limiting contacts to be presently described.

Recalling that the cylinder 30 is being drawn to the left in FIG. 3 by the belts 44, it will be appreciated that this motion is limited by the contact of the cylinder with the rings 54 at the ends of rolls 36 and 38. Once the cylinder axis position is established, the effect of belt tension of the central belts will then be to draw the plate 56 to the right along with the bearing positions of all of the rolls. Since belts cannot be accurately calibrated, it is possible that at times the belt tension might be unduly large. In this situation, the rightward drawing effect will be limited by the positioning of the cotter key 70 which is so set that the plate can only move to the position shown in the drawing and will not quite allow the rolls 36 and 38 to squeeze the belts between themselves and the cylinder 30, but will leave a modicum of space between the rolls and the cylinder so that the belt tangency points on the rolls are offset somewhat from the belt tangency points on the cylinder, emulating approximately the spacing at the end supports.

Both the tongue 64, in cooperation with the opening 66, and the contact of the upper side of the slot 62 with the bar 26 prevent any significant downward displacement of the plate 56 due to gravity, and the tie bar 26 is a barrier to any significant rotary movement of the plate in its plane about the tongue connection as a pivot whenever the belts are being driven. While the tie bar 26 is not particularly rigid in a comparative sense, the loadings involved in the action of gravity and rotary influence are not of such consequence as to produce troublesome tie bar or roll deflection.

While the foregoing description has proceeded primarily on the basis of a single spreader plate located midway of the lengths of the rolls, it will be understood that more than one such plate can be employed, and that these will operate in a manner to provide benefits to the machine construction corresponding generally to those described above for a single such plate.

Figure 5:
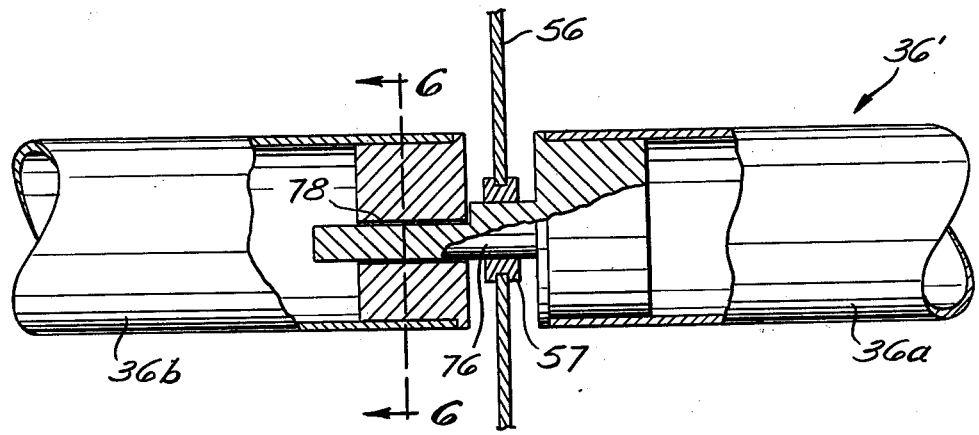
FIG. 5 is a fragmentary plan to a larger scale partly in section showing a detail of roll construction in accordance with one embodiment of the invention.
Figure 6:
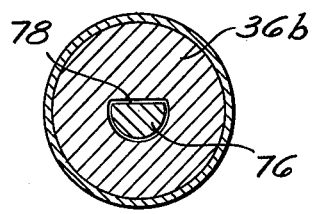
FIG. 6 is a section taken on line 6—6 of FIG. 5.

It has also been discovered that it is not even necessary to construct the rolls 36 to 42 as integral elements, and that the principal of the self-locating spreader plate will work just as effectively with rolls which are built in segments. For example, FIGS. 5 and 6 show how one of the rolls such as roll 36' might be constructed of two roll segments 36a and 36b. Segment 36a includes an integral axial stud 76 which has a close sliding fit with an internal sleeve 78 in roll segment 36b to provide a connection between the segments 36a and 36b. As seen in FIG. 6, the sleeve and stud are so shaped in cross section that they have a noncircular driving connection which insures that the segments of the roll 36' will all rotate as a unit, Surrounding the stud is a bearing which is identical with the bearings 57 and is thus similarly designated. The practical effect of this arrangement is in all respects the constructional and operative equivalent of an arrangement using integral rolls, but will offer some significant additional benefits from the standpoint of expediting machine assembly, and will do so without in any way impairing the operating effectiveness of the resulting assembly.

What is claimed is:

1. In a photocopy machine having an elongate illumination cylinder nested among a plurality of elongate belt rolls, means supporting the ends of the belt rolls and endless elastic belts trained about the belt rolls and the illumination cylinder, the improvement which comprises:

The belt rolls being so constructed as to exhibit insufficient stiffness against transverse deflection for proper operation under the transverse loading of the elastic belts over the span between the end support means; and a spreader plate means between said end support means engaging said rolls at a position between said end support means, said spreader plate means including means defining roll positions equivalent to the relative roll positions at each end support location, and being configured to provide an access throat between two of the rolls such that sheets being fed for processing can move into contact with the illumination cylinder.

2. A photocopy machine as set forth in claim 1 in which the spreader plate means is self-locating and free of firm support connection.

3. A photocopy machine as set forth in claim 2 in which the illumination cylinder has freedom of motion transversely of its axis in one direction, in which two of the rolls define between them the sheet access to the illumination cylinder, and in which the said two rolls carry spacer rings for defining the correct degree of proximity between the said two rolls and the illumination cylinder under the influence of the elastic belts.

4. A photocopy machine as set forth in claim 2 in which there is provided a locating restraint means for limiting motion of the spreader plate means in a direction of the impelling tendency thereon of the elastic belts.

5. A photocopy machine as set forth in claim 1 in which the belt rolls are segmented and comprise interfitting driving connection means for drivingly associating one segment of each mating pair with the other, and in which the spreader plate means is so located as to receive and locate the segmented roll adjacent the driving connection means.

6. A photocopy machine as set forth in claim 2 in which the belt rolls are segmented and comprise interfitting driving connection means for drivingly associating one segment of each mating pair with the other, and in which the spreader plate means is so located as to receive and locate the segmented roll adjacent the driving connection means.

7. A photocopy machine as set forth in claim 6 in which the interfitting driving connection means comprises an axial stud on one of said roll segments and a matching axial sleeve on the other segment and in which there is a bearing embracing the stud which bearing is received and located by a cooperating configuration on the spreader plate means.

* * * * *